United States Patent
Figueroa

(10) Patent No.: US 12,365,291 B1
(45) Date of Patent: Jul. 22, 2025

(54) GARBAGE CAN TRANSPORT ASSEMBLY

(71) Applicant: Orlando Figueroa, Bertram, TX (US)

(72) Inventor: Orlando Figueroa, Bertram, TX (US)

(*) Notice: Subject to any disclaimer, the term of this patent is extended or adjusted under 35 U.S.C. 154(b) by 0 days.

(21) Appl. No.: 18/404,272

(22) Filed: Jan. 4, 2024

(51) Int. Cl.
*B60R 9/06* (2006.01)
*B65F 1/14* (2006.01)
*B66F 3/16* (2006.01)

(52) U.S. Cl.
CPC .............. *B60R 9/06* (2013.01); *B65F 1/1468* (2013.01); *B66F 3/16* (2013.01)

(58) Field of Classification Search
CPC .. B65F 1/1468; B66F 3/08; B66F 3/16; B66F 5/025; B66F 3/10; B60S 9/08; B60R 9/06; B60D 1/46; B60D 1/465
USPC ............ 254/424, 425, 98; 414/462; 212/180
See application file for complete search history.

(56) References Cited

U.S. PATENT DOCUMENTS

| | | | | |
|---|---|---|---|---|
| 3,180,503 A * | 4/1965 | Shaw | ............... | B60P 1/4421 414/545 |
| 3,837,513 A * | 9/1974 | Adamek | ............ | B60P 3/122 414/541 |
| 4,071,260 A * | 1/1978 | Marshall, Sr. | ........ | B60R 3/02 280/166 |
| 4,695,218 A * | 9/1987 | Boyer | ................ | B60R 9/06 224/524 |
| 4,915,573 A * | 4/1990 | Wapner | ............ | B66B 9/0823 414/921 |
| 5,011,361 A * | 4/1991 | Peterson | .......... | B60R 9/06 224/508 |
| 5,975,553 A * | 11/1999 | Van Vleet | ........ | B60D 1/46 280/483 |
| 6,033,178 A | 3/2000 | Cummins | | |
| 6,129,371 A * | 10/2000 | Powell | .............. | B60R 9/06 280/491.5 |
| 6,312,210 B1 * | 11/2001 | Lang | ................ | B60R 9/06 224/570 |
| 6,524,054 B2 * | 2/2003 | Maney | .............. | B60P 1/4421 414/462 |
| 6,579,055 B1 * | 6/2003 | Williams | .......... | B60P 3/07 414/462 |
| 6,663,133 B1 * | 12/2003 | Rosenlund | ........ | B60D 1/06 280/490.1 |
| 7,044,445 B1 * | 5/2006 | Crawford | .......... | B60S 9/12 254/425 |
| 7,101,142 B2 | 9/2006 | Bik | | |
| 7,188,856 B2 * | 3/2007 | Maynard | .......... | B60R 9/06 414/463 |

(Continued)

FOREIGN PATENT DOCUMENTS

EP          2641758          3/2013

*Primary Examiner* — Gregory W Adams

(57) ABSTRACT

A garbage can transport assembly for transporting a garbage can on a vehicle hitch receiver includes a mounting member that is insertable into a hitch receiver of a vehicle. A lift is removably attached to the mounting member and the lift is actuatable in a lifting condition and a lowering condition. A pivoting member is removably attachable to the lift and a stanchion is coupled to and extends upwardly from the pivoting member. A support grill is pivotally coupled to the pivoting member. The support grill is positionable in a first position for supporting a garbage can thereby facilitating the garbage can to be transported with the vehicle. Conversely, the support grill is positionable in a stored position having the support grill lying on a vertical plane.

10 Claims, 9 Drawing Sheets

(56) References Cited

U.S. PATENT DOCUMENTS

| | | | |
|---|---|---|---|
| 7,704,034 B1* | 4/2010 | Quigley, III | B60P 3/125 |
| | | | 414/427 |
| 8,132,997 B2* | 3/2012 | Reuille | B60P 1/4421 |
| | | | 414/545 |
| 8,585,072 B2* | 11/2013 | Momaly | B60P 3/125 |
| | | | 280/402 |
| 8,944,742 B2 | 2/2015 | Hill | |
| 9,017,002 B1* | 4/2015 | Joynt | B60R 9/06 |
| | | | 414/462 |
| D744,382 S | 12/2015 | Woller | |
| 10,138,058 B2 | 11/2018 | Seaburg, Sr. | |
| 10,189,419 B2 | 1/2019 | Billard | |
| 2003/0165376 A1* | 9/2003 | Bruno | B60P 3/122 |
| | | | 414/462 |
| 2010/0272548 A1 | 10/2010 | McKamey | |
| 2020/0189337 A1* | 6/2020 | Berggren, Jr. | B60D 1/465 |
| 2022/0234513 A1* | 7/2022 | Landwehr | B60R 9/06 |

* cited by examiner

GARBAGE CAN TRANSPORT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to transport devices and more particularly pertains to a new transport device for transporting a garbage can with a hitch receiver on a vehicle. The device includes a mounting member that is attachable to a hitch receiver and a lift attached to the mounting member and a pivoting member attached to the lift such that the lift can lift or lower the pivoting member. The device includes a support grill that is pivotally attached to the pivoting member upon which a garbage can may be positioned to lifting the garbage can and subsequently transporting the garbage can with the vehicle.

(2) Description of Related Art Including Information Disclosed Under 37 CFR 1.97 and 1.98

The prior art relates to transport devices including a trash container lift that is mountable to a rear of a vehicle. The prior art discloses a lift that is mountable to a hitch receiver of a vehicle which engages a carrying bar on a garbage can. The prior art discloses an L-shaped mount that is mountable to an off road vehicle for transporting a garbage can. The prior art also discloses a trash container carrier that is mountable to a hitch receiver of a vehicle and which includes a lifting arm that is biased into a lifted position for lifting a garbage can. The prior art further discloses a trash can lift that is mountable to a hitch receiver of a vehicle and which includes a mount that is attached to a garbage can for engaging the trash can lift. Additionally, the prior art discloses a trash can lift that is attachable to a hitch receiver of a vehicle and which includes a winch for lifting a lowering a trash can.

BRIEF SUMMARY OF THE INVENTION

An embodiment of the disclosure meets the needs presented above by generally comprising a mounting member that is insertable into a hitch receiver of a vehicle. A lift is removably attached to the mounting member and the lift is actuatable in a lifting condition and a lowering condition. A pivoting member is removably attachable to the lift and a stanchion is coupled to and extends upwardly from the pivoting member. A support grill is pivotally coupled to the pivoting member. The support grill is positionable in a first position for supporting a garbage can thereby facilitating the garbage can to be transported with the vehicle. Conversely, the support grill is positionable in a stored position having the support grill lying on a vertical plane.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

Figure 3:
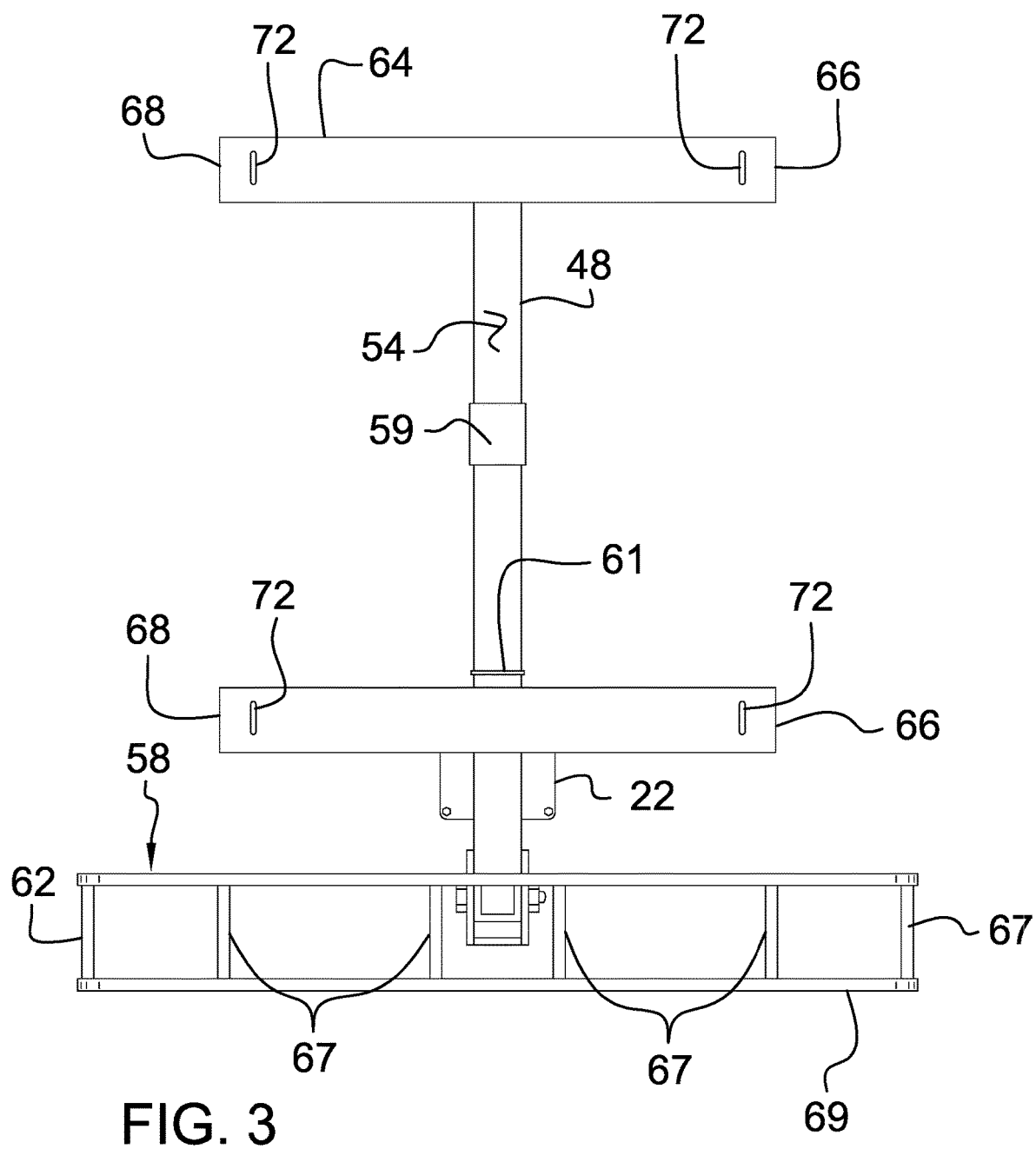
Figure 4:
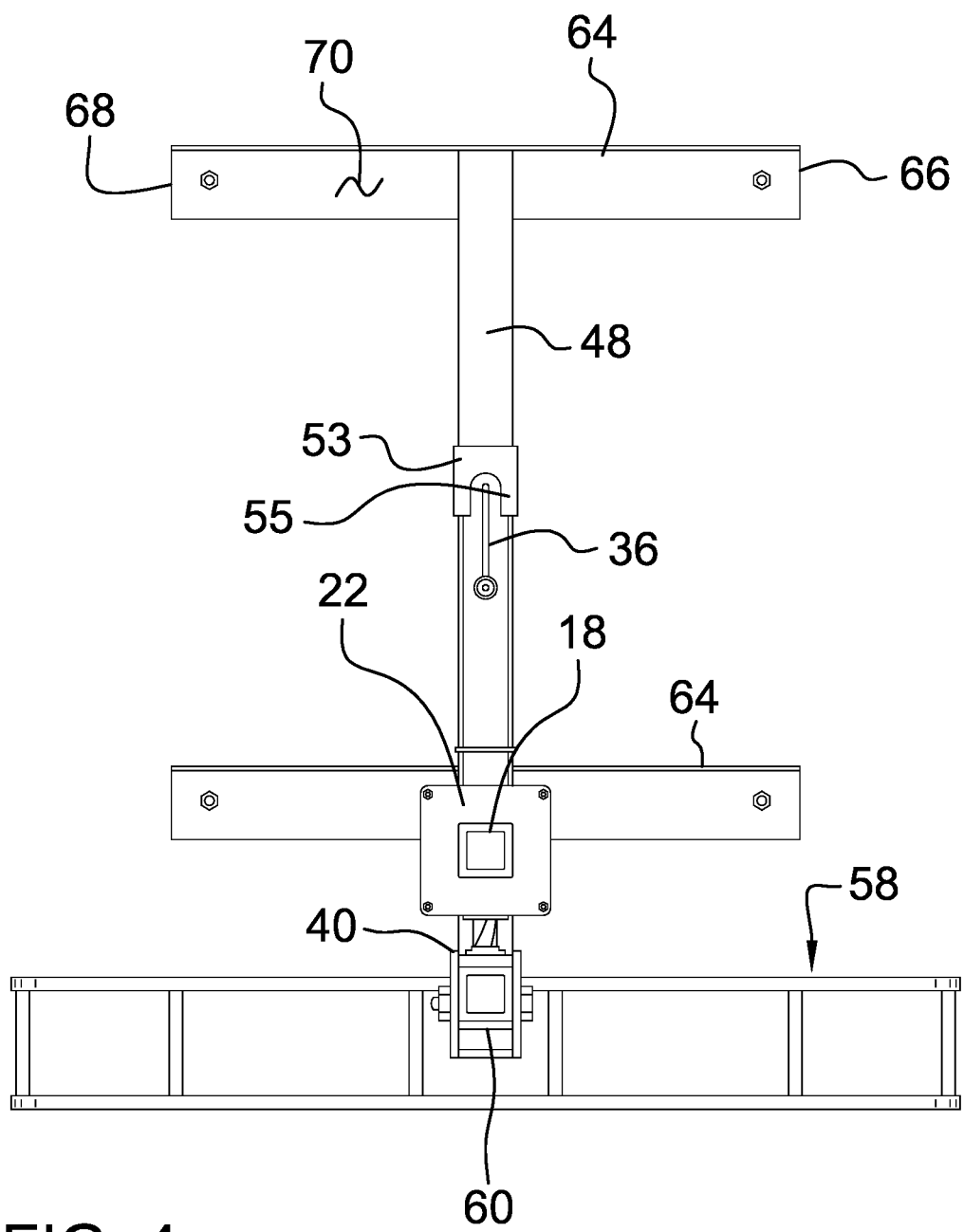
Figure 5:
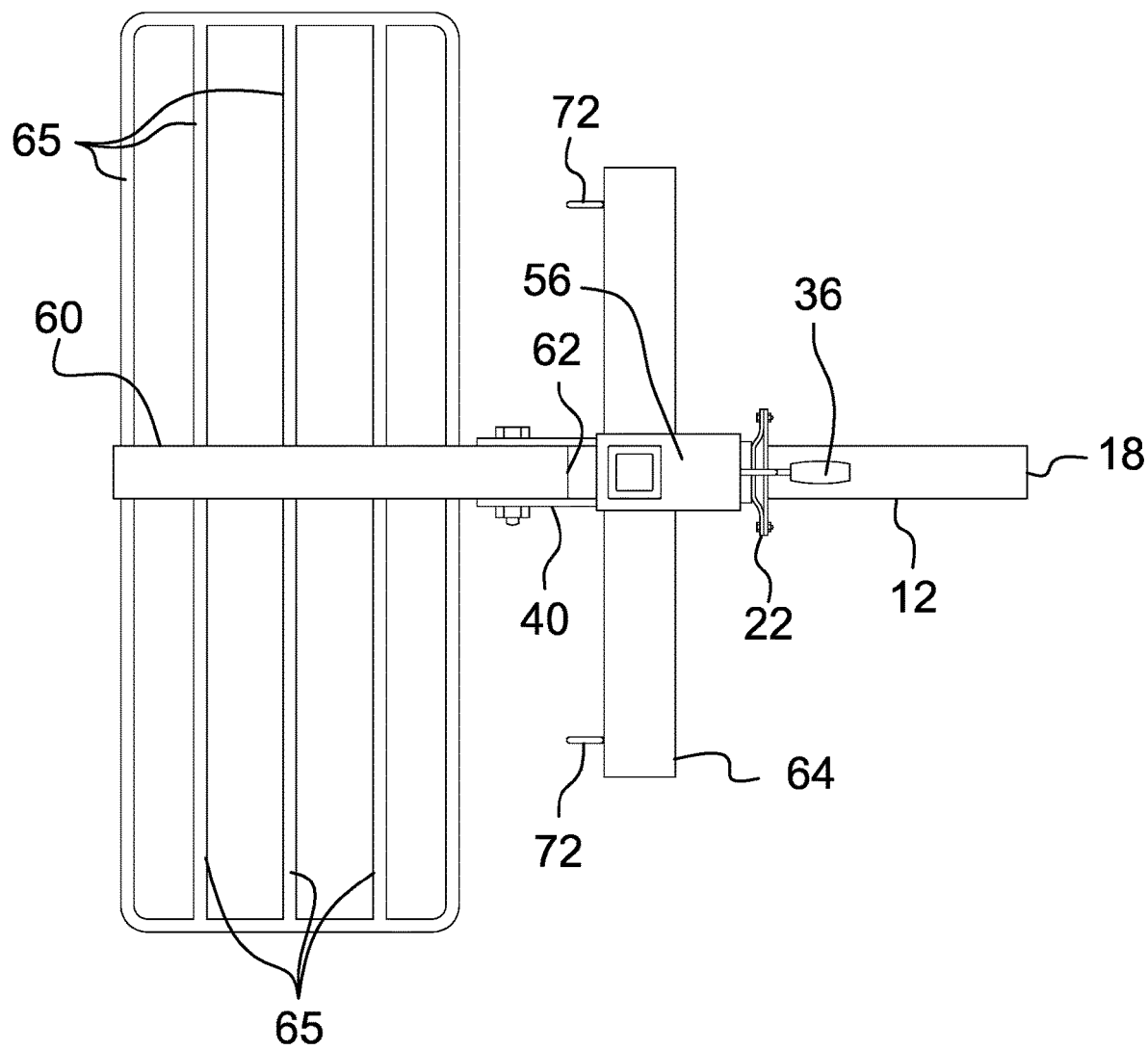
Figure 6:
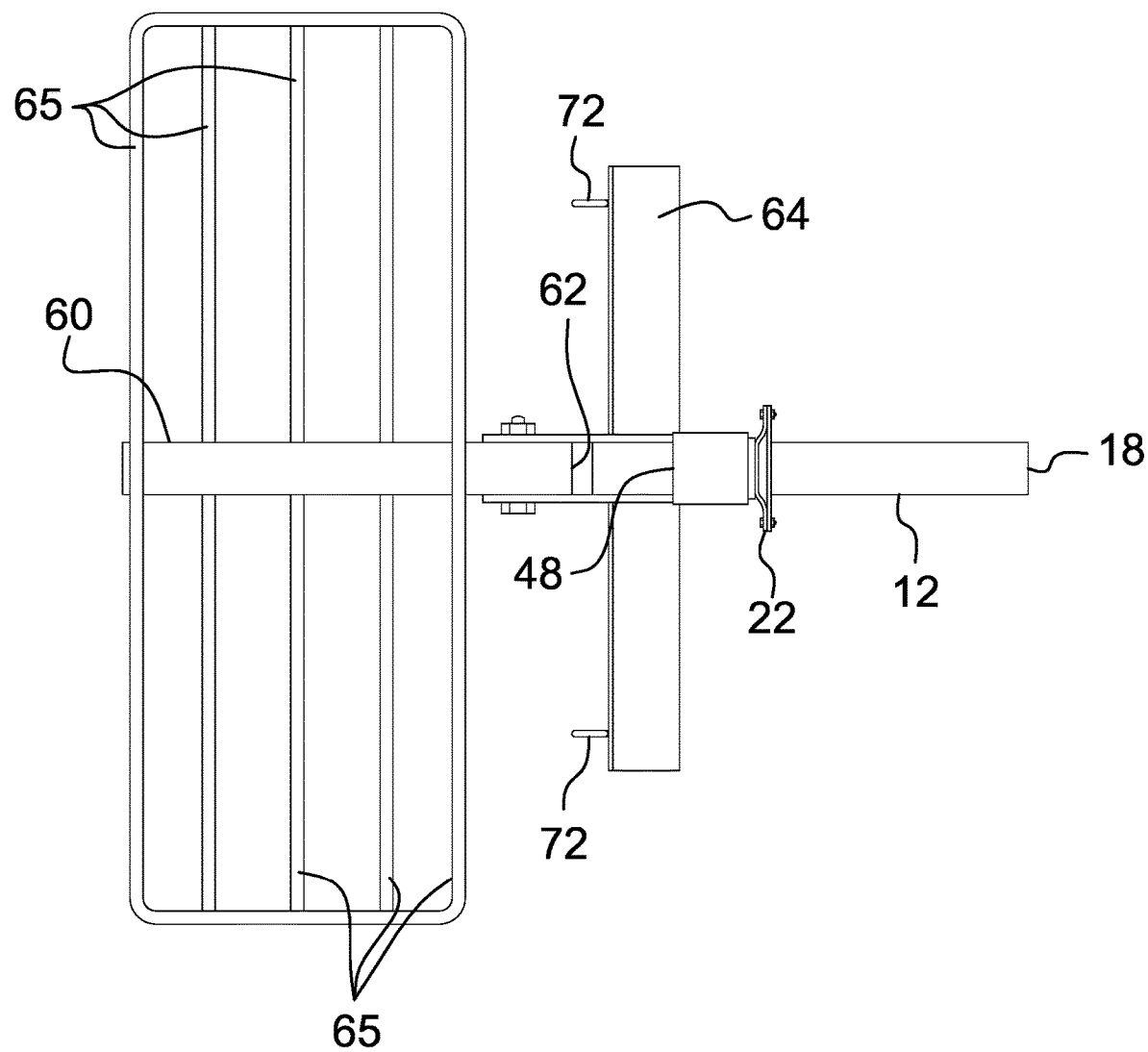
Figure 7:
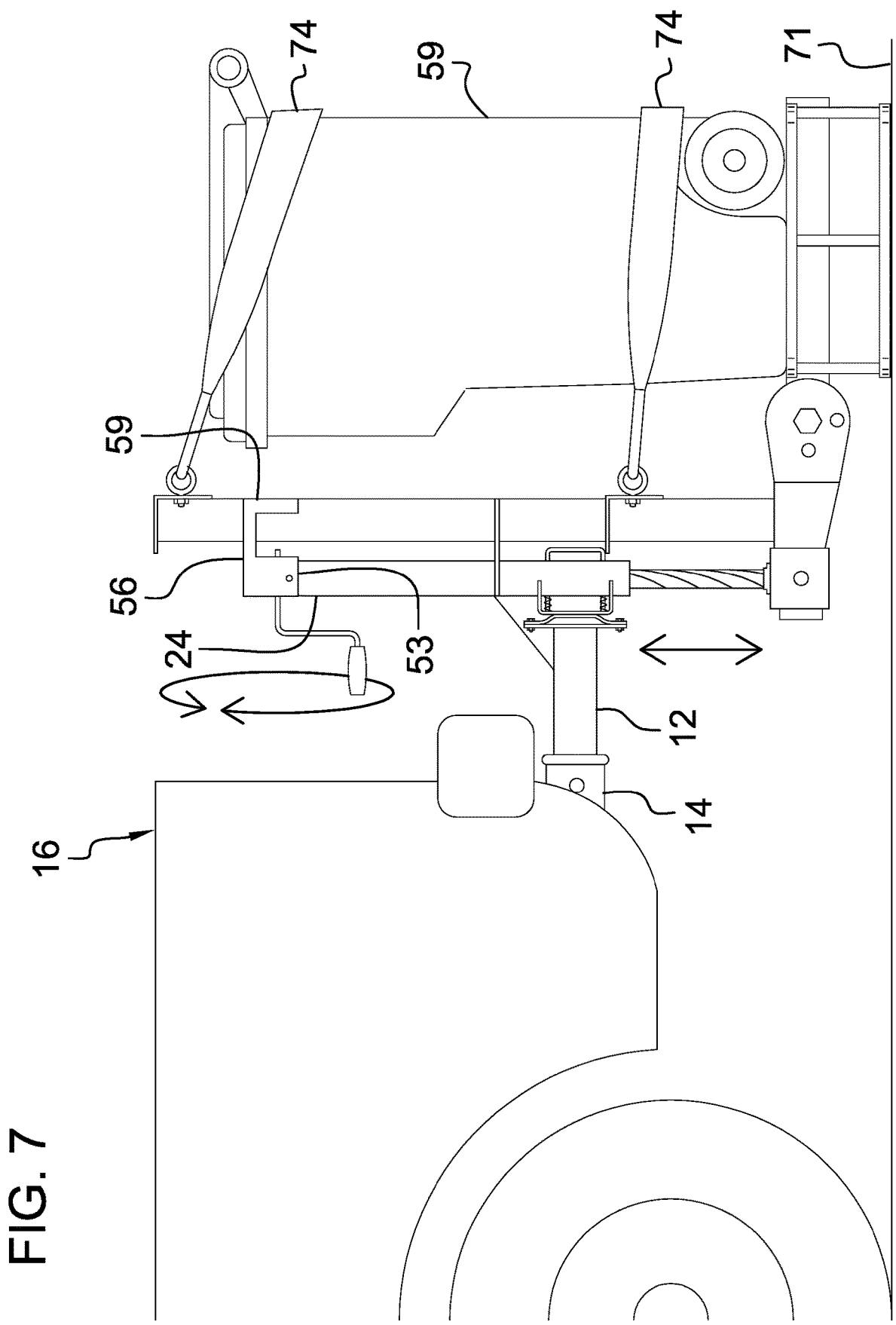

FIG. 3 is a back view of an embodiment of the disclosure.
FIG. 4 is a front view of an embodiment of the disclosure.
FIG. 5 is a back view of an embodiment of the disclosure.
FIG. 6 is a top view of an embodiment of the disclosure.
FIG. 7 is a perspective in-use view of an embodiment of the disclosure.

Figure 8:
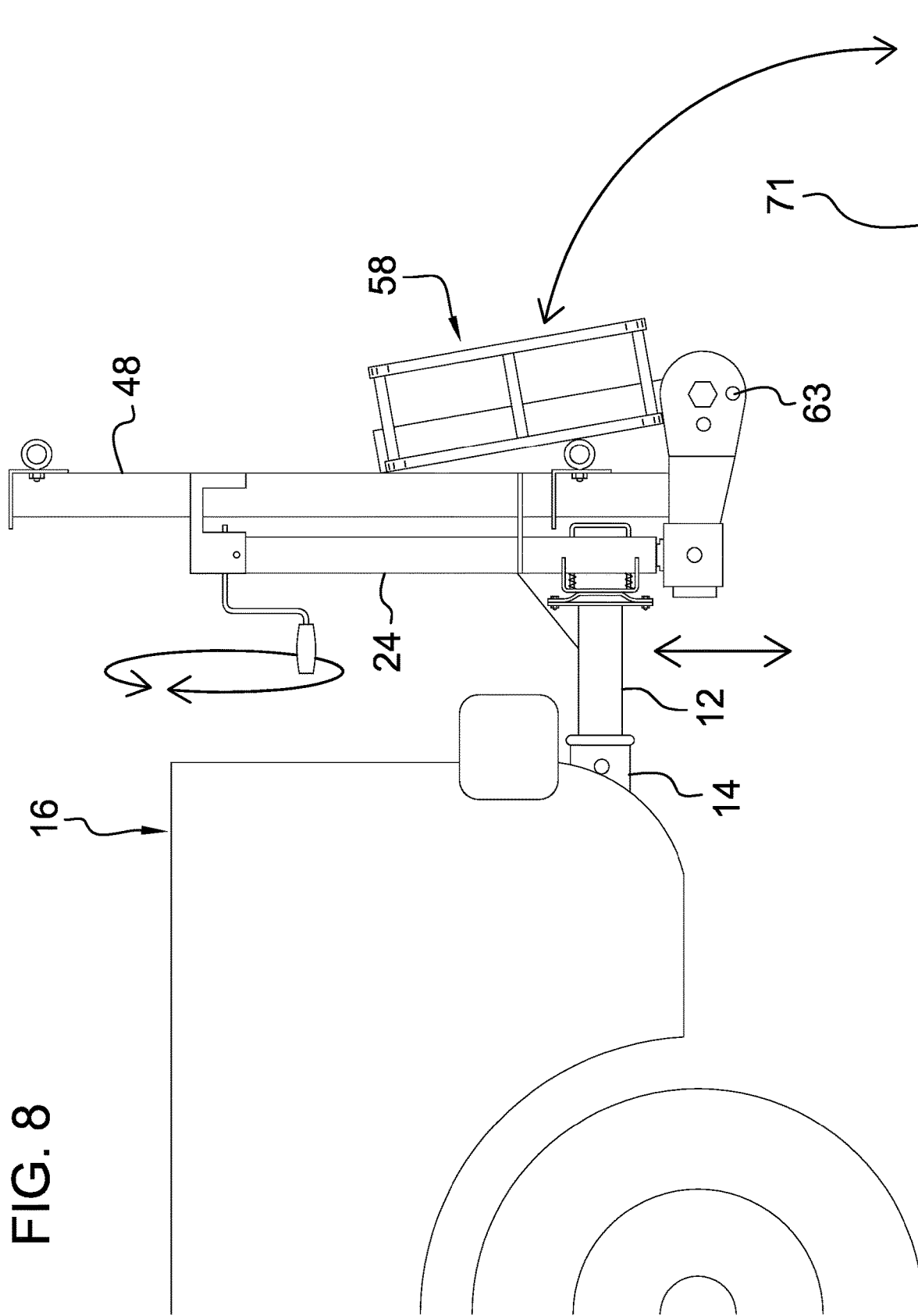

FIG. 8 is a perspective in-use view showing of an embodiment of the disclosure showing a support grill in a second position for storage.

Figure 1:
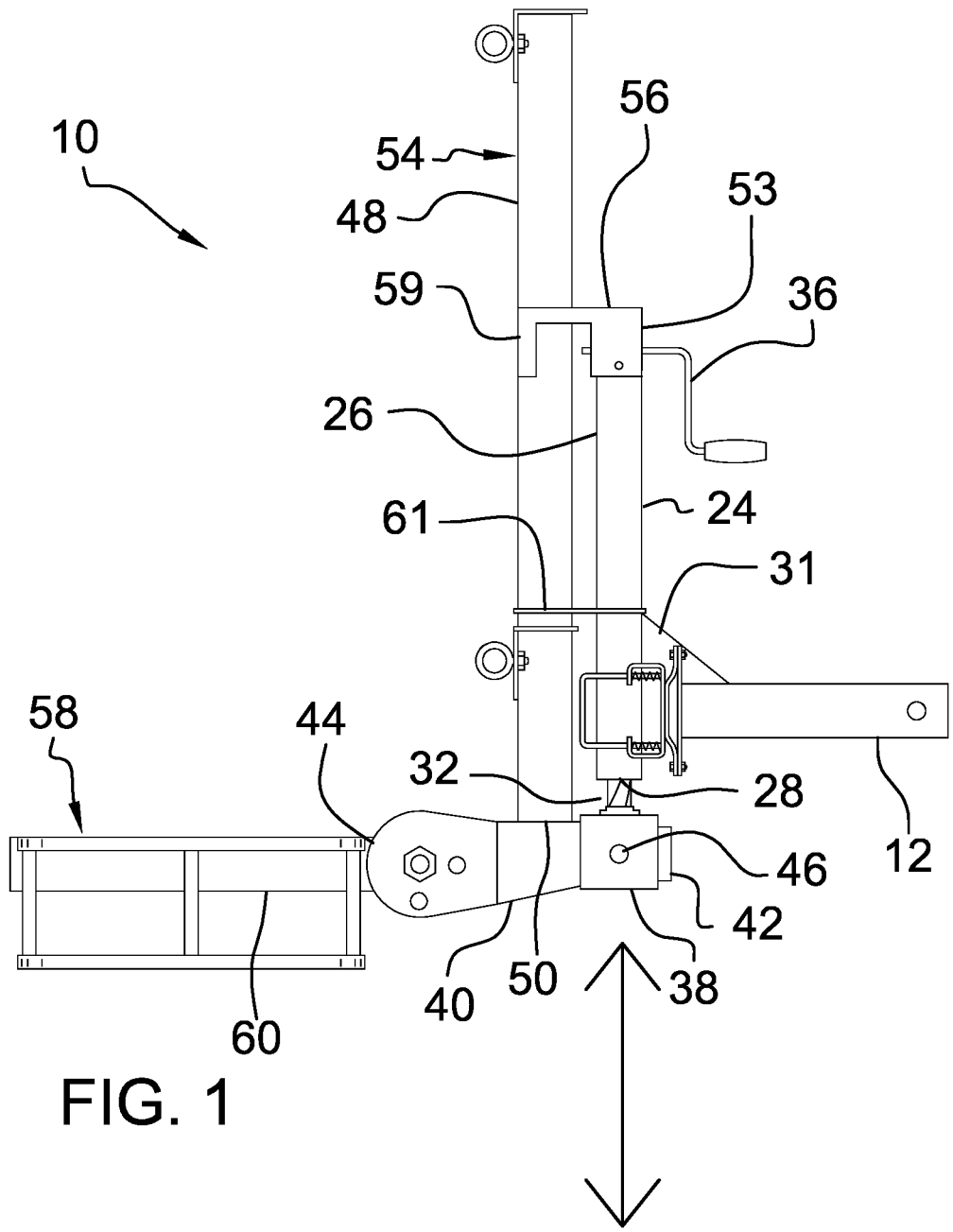
FIG. 1 is a right side view of a garbage can transport assembly according to an embodiment of the disclosure.
Figure 2:
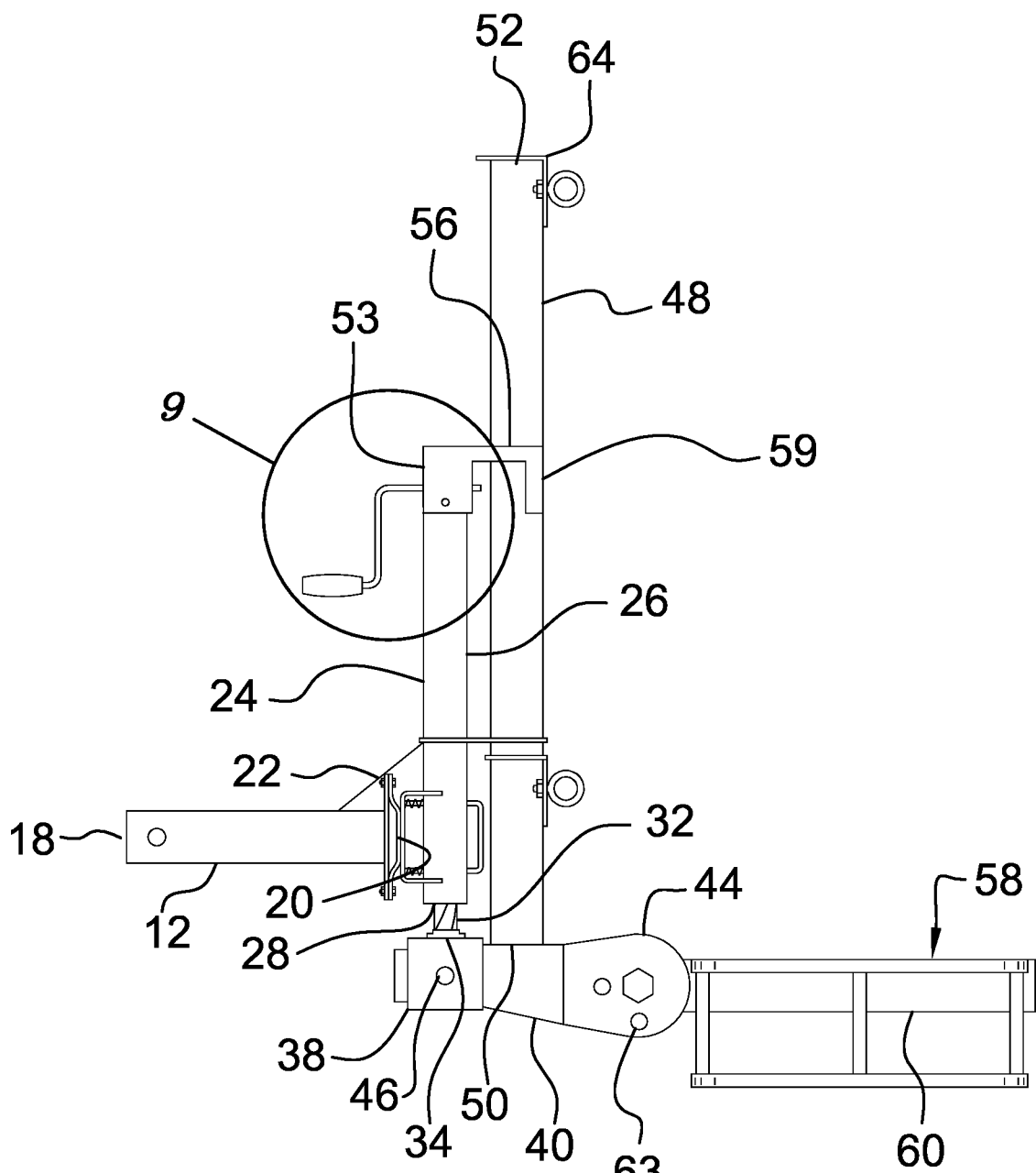
FIG. 2 is a left side view of an embodiment of the disclosure.
Figure 9:
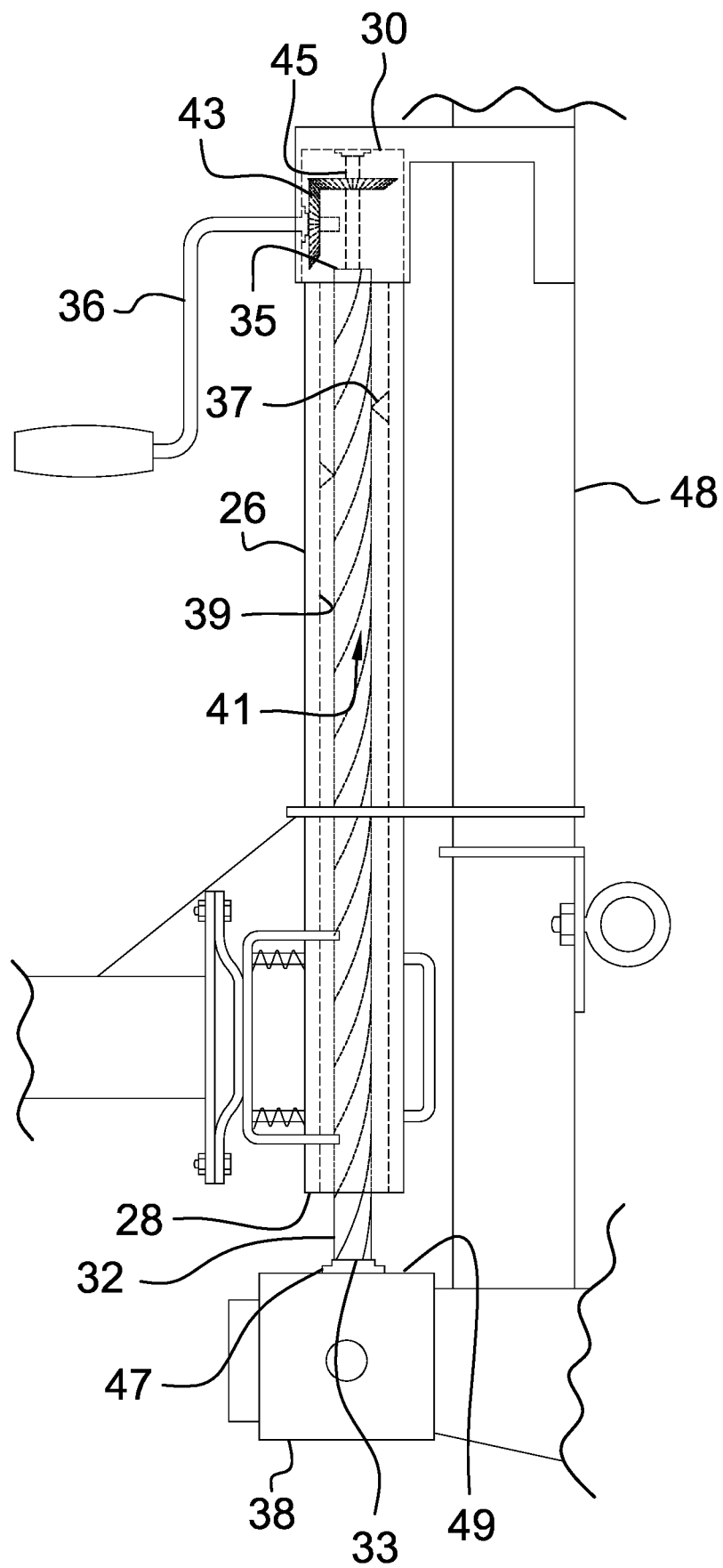

FIG. 9 is magnified phantom view taken from circle 9 of FIG. 2 of an embodiment of the disclosure.

DETAILED DESCRIPTION OF THE INVENTION

With reference now to the drawings, and in particular to FIGS. 1 through 9 thereof, a new transport device embodying the principles and concepts of an embodiment of the disclosure and generally designated by the reference numeral 10 will be described.

As best illustrated in FIGS. 1 through 9, the garbage can transport assembly 10 generally comprises a mounting member 12 that is insertable into a hitch receiver 14 of a vehicle 16. The vehicle 16 may be a passenger vehicle, a cargo vehicle or any other motorized vehicle. The mounting member 12 has a first end 18 and a second end 20, and the first end 18 is insertable into the hitch receiver 14. A coupling 22 is attached to the second end 20 of the mounting member 12.

A lift 24 is provided and the lift 24 is removably attached to the mounting member 12. The lift 24 is actuatable in a lifting condition having the lift 24 climbing upwardly and the lift 24 is actuatable in a lowering condition having the lift 24 climbing downwardly. The lift 24 comprises a sleeve 26 that has a lower end 28 and an upper end 30; the sleeve 26 is hollow and the lower end 28 is open. The coupling 22 engages the sleeve 26 such that the sleeve 26 extends along a line that is oriented perpendicular to a line extending through the first end 18 and the second end 20 of the mounting member 12 having the sleeve 26 extending upwardly from the mounting member 12. A gusset 31 is coupled between the mounting member 12 and the sleeve 26 to inhibit the sleeve 26 from deflecting on the mounting member 12.

The lift 24 includes a screw 32 that is rotatably positioned in the sleeve 26. The screw 32 extends outwardly from the lower end 28 of the sleeve 26 and the screw 32 has a lower end 33 and an upper end 35. The lift 24 includes a crank 36 that is rotatably coupled to the sleeve 26 and the crank 36 can be rotated by a user. The crank 36 is in mechanical communication with the upper end 35 of the screw 32 and the screw 32 is extended downwardly from the sleeve 26 when the crank 36 is rotated in a lowering direction. Conversely, the screw 32 is retracted into the sleeve 26 when the crank 36 is rotated in a lifting direction. The lift 24 may comprise a trailer lift jack of any conventional design.

The lift 24 includes a receiver 38 that is rotatably coupled to the lower end 33 of the screw 32. As is most clearly shown in FIG. 9, the sleeve 26 of the lift 24 includes a pair of teeth 37, both disposed on an inside surface 39 of the sleeve 26, which each engage threading 41 on the screw 32 such that the screw 32 travels upwardly and downwardly in the sleeve 26 when the screw 32 is rotated. As is additionally shown in FIG. 9, the lift 24 may include a set of drive gears 43 which are perpendicularly oriented with each other and which are driven the by crank 36. The lift 24 may further include a drive shaft 45, driven by the set of drive gears 43, which engages the upper end 35 of the screw 32 for rotating the screw 32. The receiver 38 includes a bearing 47 that is attached to a top wall 49 of the receiver 38 and the bearing 47 rotatably engages the lower end 33 of the screw 32.

A pivoting member 40 is provided and the pivoting member 40 is removably attachable to the lift 24. The pivoting member 40 is horizontally oriented when the pivoting member 40 is removably attached to the lift 24. The pivoting member 40 has a primary end 42 and a secondary end 44, and the receiver 38 insertably receives the primary end 42 of the pivoting member 40. The pivoting member 40 extends along a line that is oriented perpendicular to a line extending through the upper end 30 and the lower end 28 of the sleeve 26 of the lift 24 when the pivoting member 40 is inserted into the receiver 38. A pin 46 may be provided that is extendable through the receiver 38 and engages the pivoting member 40 for releasably retaining the pivoting member 40 in the receiver 38.

A stanchion 48 is provided and the stanchion 48 is coupled to and extends upwardly from the pivoting member 40. The stanchion 48 has a bottom end 50, a top end 52 and a first surface 54 extending therebetween, and the bottom end 50 is coupled to the pivoting member 40 such that the stanchion 48 is vertically oriented. Moreover, the stanchion 48 is spaced from the lift 24 and is oriented collinear with the lift 24 having the first surface 54 facing away from the lift 24. A collar 56 extends around the lift 24 and the stanchion 48 for retaining the stanchion 48 in a vertical orientation. The collar 56 is coupled to the lift 24 and the collar 56 slidably engages the stanchion 48 thereby facilitating the stanchion 48 to slide upwardly and downwardly in the collar 56. A cup 53 is coupled to and extends downwardly from the collar 56 and the cup 53 has a slot 55 in an outer wall 57 of the cup 53. The cup 53 extends over the upper end 30 of the sleeve 26 of the lift 24 and the slot 55 accommodates the crank 36. Additionally, a sleeve 59 extends downwardly from the collar 56 that partially surrounds the stanchion 48 for stabilizing the collar 56 on the stanchion 48.

A support grill 58 is provided and the support grill 58 is pivotally coupled to the pivoting member 40. The support grill 58 is positionable in a first position having the support grill 58 lying on a horizontal plane. In this way a garbage can 59 may be positioned on the support grill 58 thereby facilitating the garbage can 59 to be transported with the vehicle 16. Additionally, the support grill 58 is positionable in a stored position having the support grill 58 lying on a vertical plane. A bracket 61 extends around the sleeve 26 of the lift 24 and the stanchion 48 for securing the stanchion to the sleeve 26 of the lift 24. The bracket 61 is positioned adjacent to the gusset 31 which extends between mounting member 12 and the sleeve 26 of the lift 24.

The support grill 58 includes a primary member 60 which has a coupled end 62 and the coupled end 62 pivotally engages the secondary end 44 of the pivoting member 40. The primary member 60 extends along a line that is oriented parallel to a line extending through the primary end 42 and the secondary end 44 of the pivoting member 40 when the support grill 58 is in the first position. The primary member 60 extends along a line that is oriented perpendicular to the line extending through the primary end 42 and the secondary end 44 of the pivoting member 40 when the support grill 58 is positioned in the second position having the primary member 60 extending upwardly from the pivoting member 40.

A pin 63 extends through the secondary end 44 of the pivoting member 40 and the coupled end 62 of the primary member 60. The pin 63 in the pivoting member 40 retains the support grill 58 in either the first position or the second position. As is shown in FIGS. 5 and 6, the support grill 58 includes a series of lateral members 61 that each extends laterally away from the primary member 60 in opposite directions from each other. The support grill 58 includes a plurality of vertical members 67 extending downwardly from the series of lateral members 61 and a foot 69 attached to the plurality of vertical members 67 which lies on the ground 71 when the lift 24 is actuated into the lowering condition to support the weight of the garbage can 59.

A pair of supports 64 is included and each of the supports 64 has a first end 66, a second end 68 and an outer surface 70 extending therebetween. The outer surface 70 of each of the supports 64 is coupled to the first surface 54 of the stanchion 48 at a connection point that is centrally located between the first end 66 and the second end 68 of the supports 64. Each of the supports 64 is oriented to extend along a horizontal axis. Additionally, a respective one of the supports 64 is aligned with the top end 52 of the stanchion 48 and a respective one of the supports 64 is spaced from the bottom end 50 of the stanchion 48.

A plurality of eye bolts 72 is each of coupled to a respective one of the supports 64. Each of the eye bolts 72 is positioned adjacent to a respective one of the first end 66 and the second end 68 of the respective support 64. Additionally, a pair of straps 74, rope or other similar object, can be coupled to the eye bolts 72 on respective supports 64 having the straps 74 extending around the garbage can 59 when the garbage can 59 is positioned on the support grill 58. In this way each of the eye bolts 72 secures the garbage can 59 on the support grill 58.

In use, the mounting member 12 is inserted into the hitch receiver 14 thereby facilitating the lift 24 and the support grill 58 to be supported on by the hitch receiver 14. The crank 36 is rotated in the lowering direction to lower the support grill 58 onto the ground 71 and the garbage can 59 is positioned on top of the support grill 58. The crank 36 is rotated in the lifting direction to lift 24 the garbage can 59 upwardly from the ground 71. In this way the garbage can 59 can be transported with the vehicle 16 rather than requiring the user to manually transport the garbage can 59. Thus, the garbage can 59 may be more easily transported over rough terrain, muddy conditions or other conditions that would otherwise make manually transporting the garbage can 59 difficult for the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A garbage can transport assembly for carrying a garbage can on a vehicle hitch receiver, said assembly comprising:
   a mounting member being insertable into a hitch receiver of a vehicle, said mounting member having a first end and a second end, said first end being insertable into the hitch receiver;
   a coupling being attached to said second end of said mounting member;
   a lift being removably attached to said mounting member, said lift being actuatable in a lifting condition having said lift climbing upwardly, said lift being actuatable in a lowering condition having said lift climbing downwardly, said lift comprising:
      a sleeve having a lower end and an upper end, said coupling engaging said sleeve such that said sleeve extends along a line being oriented perpendicular to a line extending through said first end and said second end of said mounting member having said sleeve extending upwardly from said mounting member;
      a screw being slidably positioned in said sleeve, said screw extending outwardly from said sleeve;
      a crank being rotatably coupled to said sleeve wherein said crank is configured to be rotated by a user, said crank being in mechanical communication with said screw, said screw being extended downwardly from said sleeve when said crank is rotated in a lowering direction, said screw being retracted into said sleeve when said crank is rotated in a lifting direction; and
      a receiver being rotatably coupled to said screw;
   a pivoting member being removably attachable to said lift, said pivoting member being horizontally oriented when said pivoting member is removably attached to said lift, said pivoting member having a primary end and a secondary end, said receiver insertably receiving said primary end, said pivoting member extending along a line being oriented perpendicular to a line extending through said upper end and said lower end of said sleeve of said lift when said pivoting member is inserted into said receiver;
   a stanchion being coupled to and extending upwardly from said pivoting member; and
   a support grill being pivotally coupled to said pivoting member, said support grill being positionable in a first position having said support grill lying on a horizontal plane wherein said support grill is configured to have a garbage can positioned thereon thereby facilitating the garbage can to be transported with the vehicle, said support grill being positionable in a stored position having said support grill lying on a vertical plane, said support grill including a primary member, said primary member having a coupled end, said coupled end pivotably engaging said secondary end of said pivoting member.

2. The assembly according to claim 1, wherein said sleeve is hollow, said lower end being open.

3. The assembly according to claim 2, wherein said screw extends outwardly from said lower end of said sleeve, said screw having a lower end and an upper end.

4. The assembly according to claim 3, wherein said receiver is rotatably coupled to said lower end of said screw.

5. The assembly according to claim 1, wherein said stanchion has a bottom end, a top end and a first surface extending therebetween, said bottom end being coupled to said pivoting member such that said stanchion is vertically oriented, said stanchion being spaced from said lift and being oriented collinear with said lift, said first surface facing away from said lift.

6. The assembly according to claim 1, further comprising a collar extending around said lift and said stanchion for retaining said stanchion in a vertical orientation, said collar being coupled to said lift, said collar slidably engaging said stanchion thereby facilitating said stanchion to slide upwardly and downwardly in said collar.

7. The assembly according to claim 1, wherein said primary member of said support grill extends along a line being oriented parallel to a line extending through said primary end and said secondary end of said pivoting member when said support grill is in said first position, said primary member extending along a line being oriented perpendicular to said line extending through said primary end and said secondary end of said pivoting member when said support grill is positioned in said second position having said primary member extending upwardly from said pivoting member.

8. The assembly according to claim 5, further comprising a pair of supports, each of said supports having a first end, a second end and an outer surface extending therebetween, said outer surface of each of said supports being coupled to said first surface of said stanchion at a connection point being centrally located between said first end and said second end of said supports, each of said supports being oriented to extend along a horizontal axis, a respective one of said supports being aligned with said top end said stanchion and a respective one of said supports being spaced from said bottom end of said stanchion.

9. The assembly according to claim 8, further comprising a plurality of eye bolts, each of said plurality of eye bolts being coupled to a respective one of said supports, each of said plurality of eye bolts being positioned adjacent to a respective one of said first end and said second end of said respective support, each of said plurality of eye bolts having a strap being releasably coupled thereto having the strap extending around the garbage can when the garbage can is positioned on said support grill wherein each of said eye bolts is configured to secure the garbage can on said support grill.

10. A garbage can transport assembly for carrying a garbage can on a vehicle hitch receiver, said assembly comprising:
   a mounting member being insertable into a hitch receiver of a vehicle, said mounting member having a first end and a second end, said first end being insertable into the hitch receiver;
   a coupling being attached to said second end of said mounting member;
   a lift being removably attached to said mounting member, said lift being actuatable in a lifting condition having said lift climbing upwardly, said lift being actuatable in a lowering condition having said lift climbing downwardly, said lift comprising:
      a sleeve having a lower end and an upper end, said sleeve being hollow, said lower end being open, said coupling engaging said sleeve such that said sleeve extends along a line being oriented perpendicular to a line extending through said first end and said second end of said mounting member having said sleeve extending upwardly from said mounting member;
      a screw being slidably positioned in said sleeve, said screw extending outwardly from said lower end of said sleeve, said screw having a lower end and an upper end;
      a crank being rotatably coupled to said sleeve wherein said crank is configured to be rotated by a user, said crank being in mechanical communication with said upper end of said screw, said screw being extended downwardly from said sleeve when said crank is rotated in a lowering direction, said screw being retracted into said sleeve when said crank is rotated in a lifting direction; and
      a receiver being rotatably coupled to said lower end of said screw;
   a pivoting member being removably attachable to said lift, said pivoting member being horizontally oriented when said pivoting member is removably attached to said lift, said pivoting member having a primary end and a secondary end, said receiver insertably receiving said primary end of said pivoting member, said pivoting member extending along a line being oriented perpendicular to a line extending through said upper end and said lower end of said sleeve of said lift when said pivoting member is inserted into said receiver;
   a stanchion being coupled to and extending upwardly from said pivoting member, said stanchion having a bottom end, a top end and a first surface extending therebetween, said bottom end being coupled to said pivoting member such that said stanchion is vertically oriented, said stanchion being spaced from said lift and being oriented collinear with said lift, said first surface facing away from said lift;
   a collar extending around said lift and said stanchion for retaining said stanchion in a vertical orientation, said collar being coupled to said lift, said collar slidably engaging said stanchion thereby facilitating said stanchion to slide upwardly and downwardly in said collar;
   a support grill being pivotally coupled to said pivoting member, said support grill being positionable in a first position having said support grill lying on a horizontal plane wherein said support grill is configured to have a garbage can positioned thereon thereby facilitating the garbage can to be transported with the vehicle, said support grill being positionable in a stored position having said support grill lying on a vertical plane, said support grill including a primary member, said primary member having a coupled end, said coupled end pivotally engaging said secondary end of said pivoting member, said primary member extending along a line being oriented parallel to a line extending through said primary end and said secondary end of said pivoting member when said support grill is in said first position, said primary member extending along a line being oriented perpendicular to said line extending through said primary end and said secondary end of said pivoting member when said support grill is positioned in said second position having said primary member extending upwardly from said pivoting member;
   a pair of supports, each of said supports having a first end, a second end and an outer surface extending therebetween, said outer surface of each of said supports being coupled to said first surface of said stanchion at a connection point being centrally located between said first end and said second end of said supports, each of said supports being oriented to extend along a horizontal axis, a respective one of said supports being aligned with said top end said stanchion and a respective one of said supports being spaced from said bottom end of said stanchion; and
   a plurality of eye bolts, each of said plurality of eye bolts being coupled to a respective one of said supports, each of said plurality of eye bolts being positioned adjacent to a respective one of said first end and said second end of said respective support, each of said plurality of eye bolts having a strap being releasably coupled thereto having the strap extending around the garbage can when the garbage can is positioned on said support grill wherein each of said eye bolts is configured to secure the garbage can on said support grill.

* * * * *